July 8, 1924.
F. E. MULLEN
INSECT TRAP
Filed Nov. 6, 1923
1,500,518
2 Sheets-Sheet 1
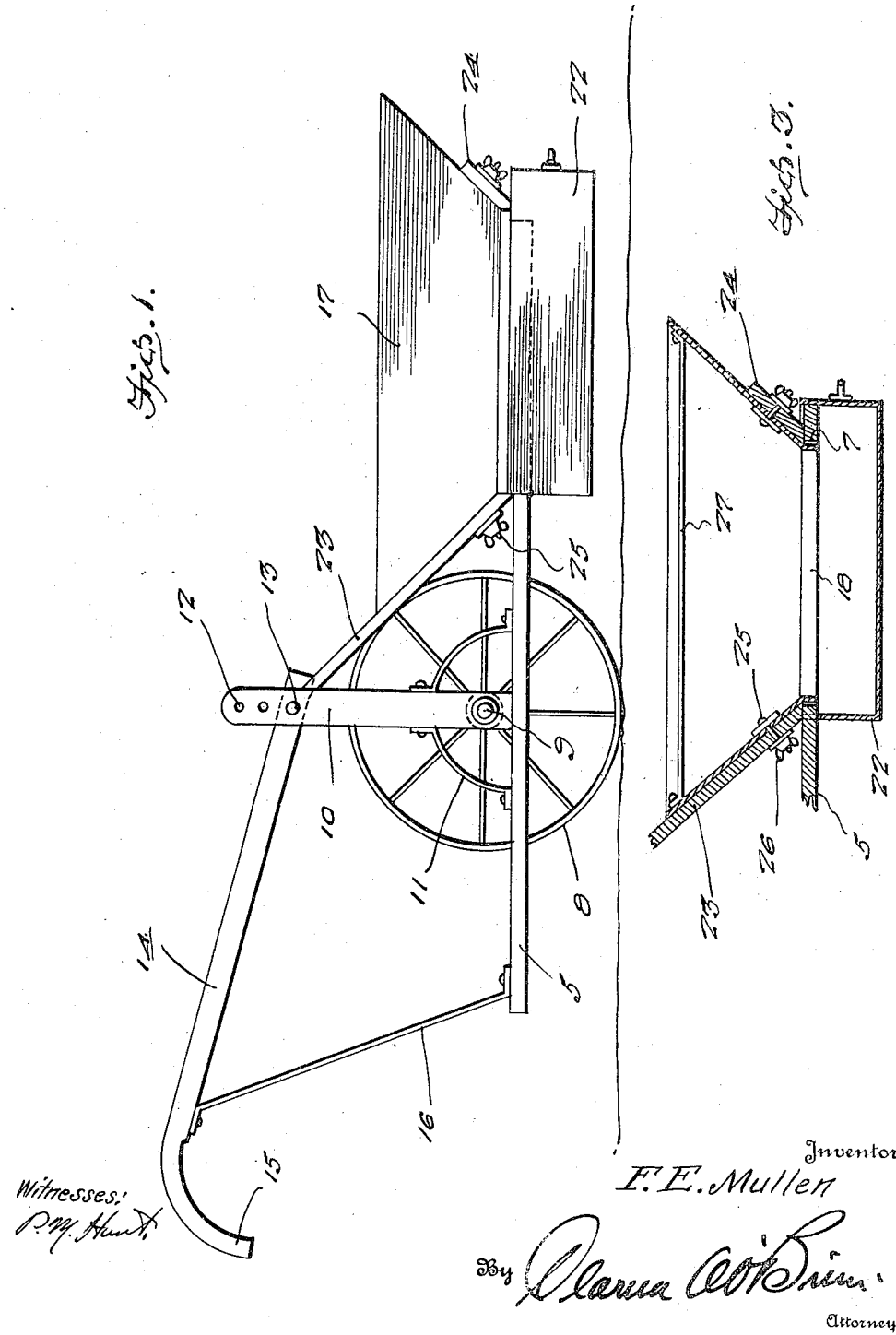
Inventor
F. E. Mullen
By Clarence O'Brien
Attorney
Witnesses:

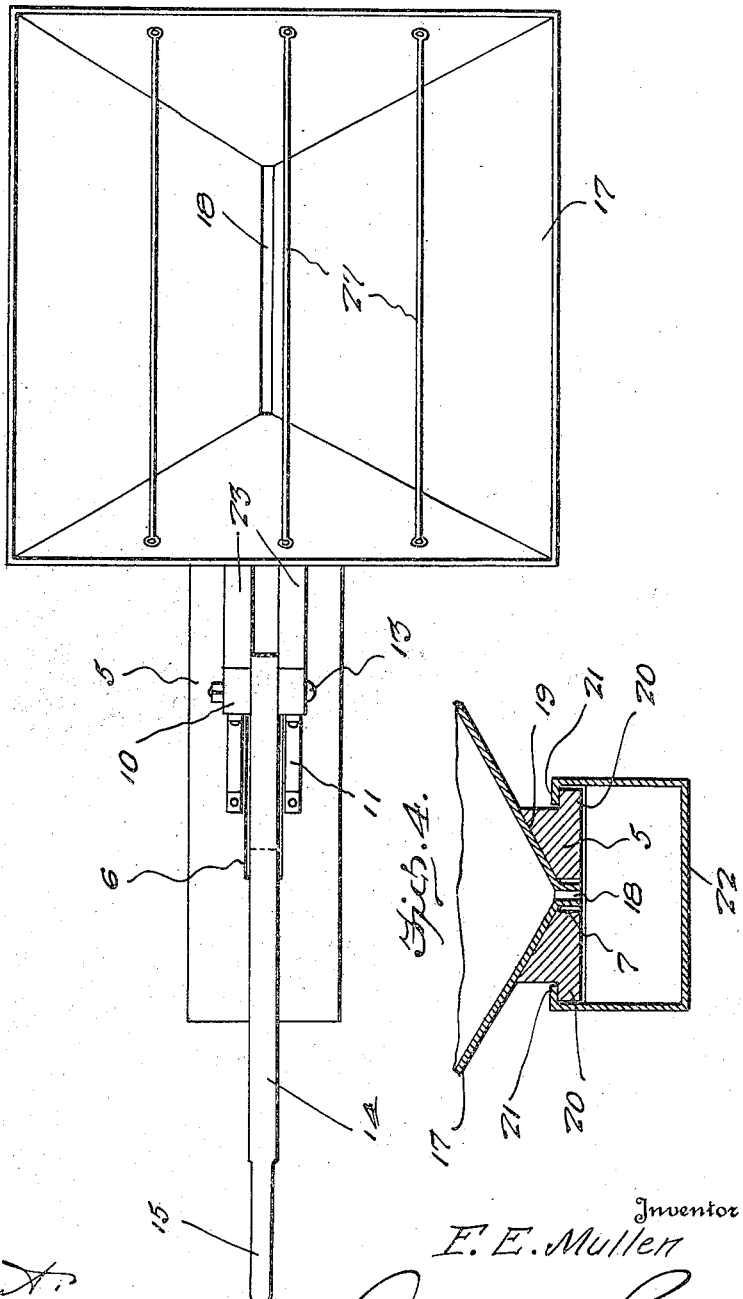

Patented July 8, 1924.

1,500,518

UNITED STATES PATENT OFFICE.

FRANK E. MULLEN, OF LEXINGTON, MISSISSIPPI.

INSECT TRAP.

Application filed November 6, 1923. Serial No. 673,112.

*To all whom it may concern:*

Be it known that I, FRANK E. MULLEN, citizen of the United States, residing at Lexington, in the county of Holmes and State of Mississippi, have invented certain new and useful Improvements in Insect Traps, of which the following is a specification.

This invention relates to insect traps and has particular reference to a portable device adapted to be manually moved along a row of plants to receive and retain the insects as they are removed from the plant.

The primary object of the invention is to provide a device of the above kind embracing the desired qualities of simplicity, durability, and efficiency in operation.

Another object of the invention is to provide an extremely light and portable form of insect trap into which insects may be readily displaced from the plants, and embodying a collection receptacle from which the insects cannot readily escape.

A further object is to provide an insect trap of the above kind which embodies a receiving hopper provided with means for facilitating displacement of the insects from the plant.

Other objects are to provide a trap chamber which is readily removable for permitting emptying of the insects to be destroyed therefrom; to provide a relationship between the trap chamber and hopper whereby the insects may not readily escape from the trap chamber and to provide a device of the above kind which is of generally desirable and improved form.

The invention consists in the novel form, combination and arrangement of parts hereinafter more fully described, shown in the accompanying drawings and claimed.

In the drawings, wherein like reference characters indicate corresponding parts throughout the several views:

Figure 1 is a side elevational view of an insect trap constructed in accordance with the present invention.

Figure 2 is a top plan view thereof.

Figure 3 is a fragmentary longitudinal sectional view, taken through the hopper and adjacent parts, and Figure 4 is a transverse sectional view, taken substantially through the device shown in Figure 3.

The form of the invention shown in the drawings embodies the platform 5 of elongated form having a pair of longitudinally elongated slots as at 6 and 7, the rear slot 6 having a supporting ground engaging wheel 8 projecting downwardly therethrough, said wheel being rotatably mounted upon an axle 9 that extends transversely of the platform 5 and is disposed with its ends projecting into openings provided in the lower ends of a pair of uprights 10. The uprights 10 extend upwardly from the platform 5 and are braced against longitudinal strains by means of suitable braces 11 between the same and the platform, and the upper ends of said uprights are provided with longitudinal series of aligned openings 12 adapted for selective reception of a transverse pin 13 that also extends through the forward end of the handle 14, whereby the height at which said forward end of the handle 14 is fixed may be adjusted. The handle 14 has downwardly curved hand hold portions 15 at its rear end and this end of the handle is supported from the platform by means of a standard 16 extending between said handle and the rear end portion of the platform 5 as clearly shown in Figure 1.

A flared hopper 17 is disposed upon the forward portion of the platform 5 and has a relatively narrow elongated tubular outlet 18 in the bottom thereof, which is disposed in the slot 7 of the platform, but spaced from the walls of said slot at all points for a purpose which will presently become apparent.

The downwardly converging side walls of the hopper 17 may snugly engage a substantially V-shaped seat formed in the upper surface of the platform 5 as shown in Figure 4, as at 19, and the side portion of the platform 5 at opposite sides of the hopper 17 form ledges 20 over which engage hook shaped flanges 21 provided upon the upper edges of the side walls of the trap chamber forming receptacle 22. The front wall of the receptacle 22 is sufficiently high to come into contact with the forward end of the platform 5 as shown in Figure 3, when said receptacle is disposed beneath the outlet 18, of the member 17, so that rearward movement of the receptacle onto the ledge 20 is limited to the proper point, the rear wall of the receptacle 22 being cut away, for permitting the sliding movement of the receptacle 22 onto the lower part of the ledges 20 in a manner similar to the operation of a drawer. It will thus be seen that insects falling upon the inclined wall of the hopper 17 will pass into the drawer 22 through the outlet 18 of said hopper, and as the outlet 18 is spaced from the walls of the slot 7, effective prevention of escape of the insects from the receptacles 22 is had.

Upwardly diverging members 23 and 24 are fixed upon the platform 5 respectively at the rear and forward sides of the hopper 17 so as to form rests for the sides of the hopper, and bolts 25 extend through the front and rear walls of the hoppers 17 as well as thru the members 23 and 24 and have wing nuts 26 threaded upon the outer ends thereof whereby the hopper is removably rigidly fastened in place with its outlet portion 18 disposed in the slot 7. The upper ends of the pair of bars 23 are respectively secured to the upper end portions of the uprights 10 for placing the latter and for placing the members 23 in their proper positions.

Rigidly secured to the hopper 17 and extending across the open top thereof are a plurality of rods 27 that preferably extend longitudinally of the device as shown in Figure 2.

In operation, the attendant grasps the hand hold 15 of the handle 14 in one hand and causes forward travelling movement of the device upon the supporting wheel 8 alongside the row of plants from which the insects are to be removed and collected. During the movement of the device, the plants are brought over against the bars 27 by any suitable means such as a brush or stick held in the other hand of the operator and such brush or stick is used to forcibly move the foliage and branches of the plants several times against the bars 27 so as to effectively displace the insects therefrom. The insects thus displaced fall onto the inclined walls of the hopper 17 and then naturally pass downwardly thru the outlet 18 of the hopper into the drawer or receptacle 22 from which they may be conveniently removed from time to time as found necessary by removal of said drawer.

From the above description it is believed that the construction and operation as well as the advantages of the present invention will be readily understood and appreciated by those skilled in the art.

Minor changes may be made without departing from the spirit and scope of the invention as claimed.

What I claim as new is:

In an insect trap of the character described, a wheeled platform having a rearwardly extending handle for facilitating manual movement of the device along a row of plants and provided with a slot in the forward end portion thereof, a hopper disposed above the forward end of the platform and having a tubular outlet depending into but spaced entirely from the walls of said slot, and a removable drawer slidably suspended from the platform beneath said outlet of the hopper, said platform having a further slot in the rear end portion thereof in which the supporting wheel of the platform is positioned, uprights upon the platform supporting a transverse axle at the lower end upon which the supporting wheel is journalled, the forward end of the handle being adjustably attached to the upper ends of said uprights.

In testimony whereof I affix my signature.

FRANK E. MULLEN.